US010619567B2

(12) United States Patent
Roever

(10) Patent No.: US 10,619,567 B2
(45) Date of Patent: *Apr. 14, 2020

(54) RECONFIGURABLE LUBRICATION SYSTEM FOR MULTIPLE POWERTRAIN ORIENTATIONS

(71) Applicant: Rolls-Royce Corporation, Indianapolis, IN (US)

(72) Inventor: Douglas M. Roever, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 405 days.

This patent is subject to a terminal disclaimer.

(21) Appl. No.: 15/481,006

(22) Filed: Apr. 6, 2017

(65) Prior Publication Data

US 2017/0314469 A1 Nov. 2, 2017

Related U.S. Application Data

(60) Provisional application No. 62/329,564, filed on Apr. 29, 2016.

(51) Int. Cl.
| | |
|---|---|
| *F01D 25/20* | (2006.01) |
| *F02C 7/32* | (2006.01) |
| *F02C 7/06* | (2006.01) |
| *F02C 7/20* | (2006.01) |
| *F02C 7/36* | (2006.01) |
| *F02C 6/20* | (2006.01) |
| *F01D 25/18* | (2006.01) |
| *B64D 27/20* | (2006.01) |
| *B64D 33/00* | (2006.01) |

(52) U.S. Cl.
CPC .............. *F02C 7/06* (2013.01); *F01D 25/18* (2013.01); *F01D 25/20* (2013.01); *F02C 6/206* (2013.01); *F02C 7/20* (2013.01); *F02C 7/32* (2013.01); *F02C 7/36* (2013.01); *B64D 27/20* (2013.01); *B64D 33/00* (2013.01); *F05D 2260/4031* (2013.01); *F05D 2260/98* (2013.01)

(58) Field of Classification Search
CPC ......... B64D 27/20; F01D 25/18; F01D 25/20; F02C 7/06; F02C 7/20; F02C 7/32; F05D 2260/4031; F05D 2260/98
See application file for complete search history.

(56) References Cited

U.S. PATENT DOCUMENTS

| | | | |
|---|---|---|---|
| 4,117,907 A | * | 10/1978 | Lechler ................ F01M 11/067 123/196 CP |
| 4,825,825 A | | 5/1989 | Chino et al. |
| 4,891,934 A | | 1/1990 | Huelster |
| 7,631,485 B2 | | 12/2009 | Suciu et al. |

(Continued)

FOREIGN PATENT DOCUMENTS

DE 2557888 A1 6/1977

*Primary Examiner* — Scott J Walthour
(74) *Attorney, Agent, or Firm* — Barnes & Thornburg LLP

(57) ABSTRACT

A gas turbine engine assembly and a method for assembling a gas turbine engine assembly are disclosed herein. The gas turbine engine assembly includes an engine core and a gearbox. The gearbox includes a lubrication system having a first sump and a second sump. The lubrication system is configurable to provide oil from either of the first and second sumps in various configurations of the gas turbine engine assembly.

20 Claims, 4 Drawing Sheets

(56) References Cited

U.S. PATENT DOCUMENTS

| | | | |
|---|---|---|---|
| 7,886,875 B2 | 2/2011 | Shevchencko et al. | |
| 8,083,030 B2 | 12/2011 | Portlock | |
| 8,256,576 B2 | 9/2012 | Glahn et al. | |
| 2009/0308365 A1 | 12/2009 | Atkinson et al. | |
| 2010/0019505 A1 | 1/2010 | Frost | |
| 2013/0048091 A1* | 2/2013 | DiBenedetto | F01D 25/20 137/2 |
| 2013/0283756 A1* | 10/2013 | Baker | F02K 3/06 60/39.01 |
| 2014/0069743 A1 | 3/2014 | Xu | |
| 2014/0093356 A1 | 4/2014 | Stutz et al. | |
| 2014/0150439 A1 | 6/2014 | Pamin et al. | |
| 2014/0256494 A1 | 9/2014 | Lewis et al. | |
| 2016/0010499 A1* | 1/2016 | Gatto | F02C 7/06 184/6.11 |
| 2016/0341124 A1 | 11/2016 | Ross et al. | |

\* cited by examiner

RECONFIGURABLE LUBRICATION SYSTEM FOR MULTIPLE POWERTRAIN ORIENTATIONS

PRIORITY CLAIM

This application claims the benefit of and priority to U.S. Provisional Patent Application Ser. No. 62/329,564, filed Apr. 29, 2016, which is incorporated herein by this reference in its entirety.

FIELD OF THE DISCLOSURE

The present disclosure relates generally to gas turbine engine assemblies, and more specifically to lubrication systems used with gas turbine engine assemblies.

BACKGROUND

A gas turbine engine assembly may include an engine core and a gearbox. During operation of the gas turbine engine assembly, the engine core may provide power to the gearbox and the gearbox may convert the work of the engine core for output. The gearbox of a gas turbine engine assembly may be lubricated by a lubrication system which may include various sumps, pumps, and distribution lines.

A gas turbine engine assembly may have various configurations to accommodate use in different applications. The various configurations of a gas turbine engine assembly may affect the operation of the sumps, pumps, and distribution lines of the lubrication system. To configure the lubrication system for a specific application of the gas turbine engine assembly selection from multiple gearboxes stored in inventory may be required.

SUMMARY

The present disclosure may comprise one or more of the following features and combinations thereof.

According to the present disclosure, a gas turbine engine assembly may include an engine core extending around a central axis and a gearbox coupled to the engine core. The gearbox may include a lubrication system having a pump adapted to pressurize oil.

In illustrative embodiments, the gearbox may include a first sump located within a housing and configured to collect oil moved into the first sump by way of gravitational force when the housing is arranged in a first orientation, a second sump located within the housing and configured to collect oil moved into the second sump by way of gravitational force when the housing is arranged in a second orientation, and a manifold. The manifold may be fluidly coupled to the pump by a pump line, to the first sump by a first-sump line, and to the second sump by a second-sump line. The manifold may include a configuration plate configured to fluidly couple the pump line to one of the first-sump line and the second-sump line.

In illustrative embodiments, the engine core may be configured to discharge pressurized gasses aftward along the central axis when the housing is arranged in each of the first and second orientations. In other embodiments, exhaust gasses may follow a non-linear gas path and the engine core may discharge pressurized gasses in other directions.

In illustrative embodiments, the configuration plate is further configured to block fluid communication between the pump line and one of the first-sump line and the second-sump line. At least a portion of the first-sump line and the second-sump line may be integrally formed in the housing.

In illustrative embodiments, the manifold may include a plenum formed to include a pump aperture opening into the pump line, a first-sump aperture opening into the first-sump line, and a second-sump aperture opening into the second-sump line. The plenum may be integrally formed in the housing.

In illustrative embodiments, the configuration plate includes a cap configured to cover the plenum and a plug extending from the cap into the plenum to block fluid communication into the plenum from one of the first-sump aperture and the second-sump aperture.

In illustrative embodiments, the first orientation differs from the second orientation by about 180 degrees measured about the central axis. The gearbox may be arranged about a centerline that is located above the central axis when the housing is arranged in the first orientation and below the central axis when the housing is arranged in the second orientation.

According to another aspect of the present disclosure, an aircraft may include a fuselage, a first gas turbine engine assembly coupled to one side of the fuselage, and a second gas turbine engine assembly coupled to another side of the fuselage opposite the one side. The first and second gas turbine engine assemblies may each include a gearbox having a lubrication system.

In illustrative embodiments, the lubrication systems may each include a pump, a first sump arranged within a housing and configured to collect oil moved by way of gravitational force when the corresponding first or second gas turbine engine assembly is in a first orientation, a second sump arranged within the housing and configured to collect oil moved by way of gravitational force when the corresponding first or second gas turbine engine assembly is in a second orientation, and a manifold fluidly coupled to the pump by a pump line, to the first sump by a first-sump line, and to the second sump by a second-sump line. The manifold may include a configuration plate configured to fluidly couple the pump line with one of the first-sump line and the second-sump line.

In illustrative embodiments, the gearbox includes a gear set supported by the housing and in fluid communication with the lubrication system. In illustrative embodiments, the configuration plate is configured to block fluid communication between the pump line and one of the first-sump line and the second-sump line.

In illustrative embodiments, at least a portion of the first-sump line and the second-sump line are integrally formed in the housing. In illustrative embodiments, the manifold includes a plenum formed to include a pump aperture opening into the pump line, a first-sump aperture opening into the first-sump line, and a second-sump aperture opening into the second-sump line. In illustrative embodiments, the plenum is integrally formed in the housing.

In illustrative embodiments, the configuration plate includes a cap configured to cover the plenum and a plug extending from the cap into the plenum to block fluid communication into the plenum from one of the first-sump aperture and the second-sump aperture.

In illustrative embodiments, each of the first and second gas turbine engine assemblies include an engine core extending around a central axis that is coupled to the gearbox. The gearbox may be a propeller gearbox arranged about a centerline. The central axis is located radially outward of the centerline.

In illustrative embodiments, each of the first and second gas turbine engine assemblies include an accessory gearbox, the accessory gearbox of the first gas turbine engine assembly has a first orientation relative to the fuselage, and the accessory gearbox of the second gas turbine engine assembly has a second orientation relative to the fuselage different from the first orientation.

According to another aspect of the present disclosure, a method of assembling a gas turbine engine assembly is presented. The method may include coupling a gearbox to an engine core that is arranged entirely aft of the gearbox along a central axis, coupling a pump to a plenum by a pump line, coupling a first sump to the plenum by a first-sump line, and coupling a second sump to the plenum by a second-sump line.

In illustrative embodiments, the method may include blocking fluid communication into the plenum from one of the first sump and the second sump by coupling a configuration plate to the plenum.

In illustrative embodiments, coupling the configuration plate to the plenum includes coupling the configuration plate to the plenum such that a plug included in the configuration plate extends into one of the first-sump line or the second-sump line to block fluid communication into the plenum from one of the first sump and the second sump.

These and other features of the present disclosure will become more apparent from the following description of the illustrative embodiments.

DETAILED DESCRIPTION OF THE DRAWINGS

Figure 1:
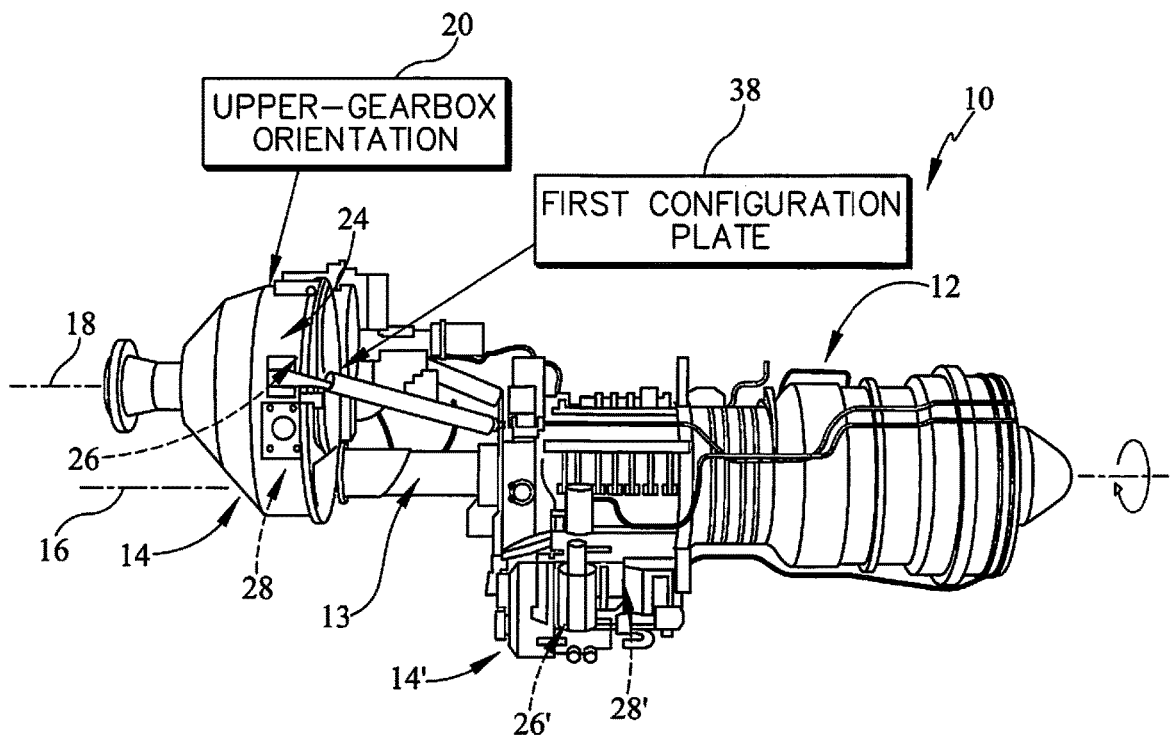
FIG. 1 is a side elevation view of a reconfigurable gas turbine engine assembly arranged in an upper-gearbox orientation in which a centerline of a gearbox included in the gas turbine engine assembly is located above of a central axis of an engine core included in the gas turbine engine assembly.
Figure 2:
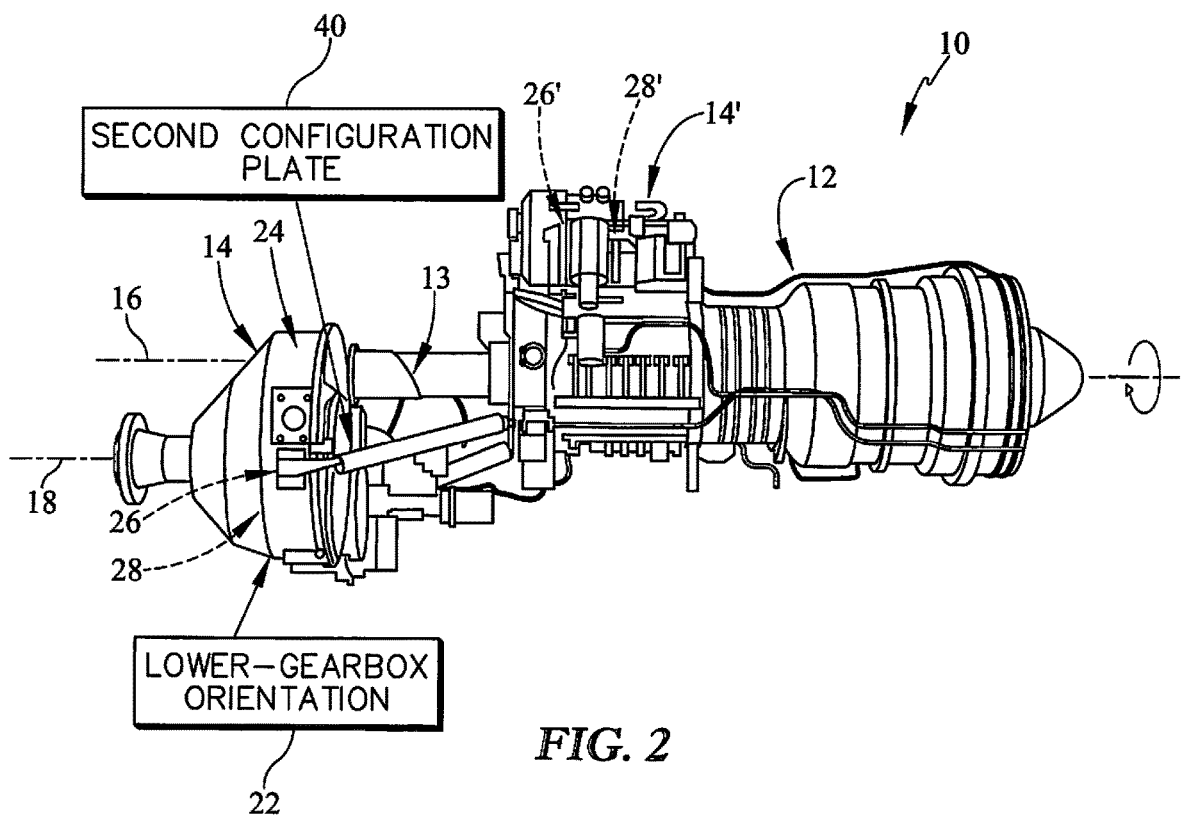
FIG. 2 is a side elevation view of the reconfigurable gas turbine engine assembly of FIG. 1 arranged in a lower-gearbox orientation in which the centerline of the gearbox is located below the central axis of the engine core.

Referring now to FIGS. 1 and 2, an illustrative reconfigurable gas turbine engine assembly 10 includes an engine core 12 and a gearbox 14 coupled to the engine core 12. The engine core 12 extends around and along a central axis 16 and the gearbox 14 is arranged around a centerline 18. The engine core 12 is illustratively arranged entirely aft of the gearbox 14 along the central axis 16. Put differently, the engine core 12 is arranged aft of the gearbox 14 along the central axis 16.

The orientation of the gas turbine engine assembly 10 may be changed as suggested in FIGS. 1 and 2 to accommodate use of the assembly 10 in different applications, i.e. in different airframes, generator systems, or pump modules. A lubrication system 26 included in the gearbox 14 is reconfigurable to provide means for lubricating a gear set 28 with oil from a gravity-fed sump 32, 34 when the gas turbine engine assembly is in various different orientations.

Illustratively, the gas turbine engine assembly 10 may be arranged in an upper-gearbox orientation 20 in which the centerline 18 of the gearbox 14 is located above the central axis 16 of the engine core 12 as shown in FIG. 1. The gas turbine engine assembly 10 may also be arranged in a lower-gearbox orientation 22 in which the centerline 18 of the gearbox 14 is located below the central axis 16 of the engine core 12 as shown in FIG. 2. For example, the upper-gearbox orientation 20 may differ from the lower-gearbox orientation 22 by about 180 degrees measured about the central axis 16. The gas turbine engine assembly 10 may also be used in various other orientations as desired by the intended application of the assembly 10.

The engine core 12 is of generally axial construction and is configured to discharge pressurized gasses aftward along the central axis 16 when the gas turbine engine assembly 10 is in each of the upper-gearbox and lower-gearbox orientations 20, 22. The gearbox 14 is configured to adjust rotational power provided by an output shaft 13 when the assembly 10 is arranged in each of the orientations 20, 22 so that the engine core 12 may be used with a fan, a propeller, a power take-off shaft, or the like.

The gearbox 14 illustratively is a propeller gearbox and includes a housing 24 along with the lubrication system 26 as shown in FIGS. 1 and 2. The housing 24 is configured to at least partially, if not wholly, contain the components of the lubrication system 26. The lubrication system 26 is configured to collect and recirculate lubricant (e.g., oil) drained from a gear set 28 included in the gearbox 14 onto portions of the gear set 28 requiring lubrication. The lubrication system 26 is configured to provide oil to the gear set 28 from one of first and second sumps 32, 34 when a pump 30 is fluidly coupled to one of the sumps 32, 34 in one of the orientations 20, 22 of the gas turbine engine assembly 10. The lubrication system 26 (or 26') may also supply oil to various engine core 12 bearing chambers and/or other locations that are lubricated.

Figure 5:
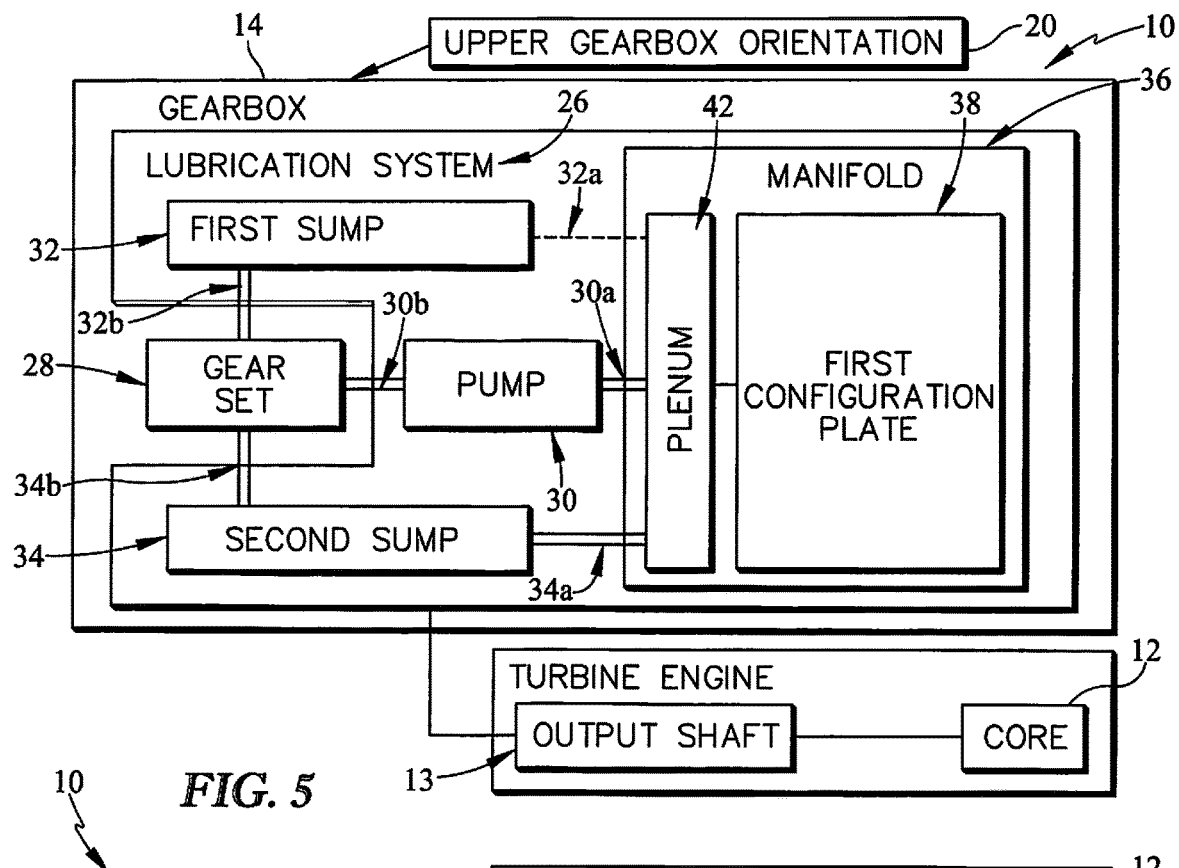
FIG. 5 is a diagrammatic view of the reconfigurable gas turbine engine assembly of FIG. 1 showing that the lubrication system includes a pump configured to move oil toward the gear set to lubricate the gear set and a second sump arranged to collect oil moved by way of gravity out of the gear set while the gas turbine engine assembly is in the upper-gearbox orientation, and showing that the first configuration plate fluidly couples the pump to the second sump.
Figure 6:
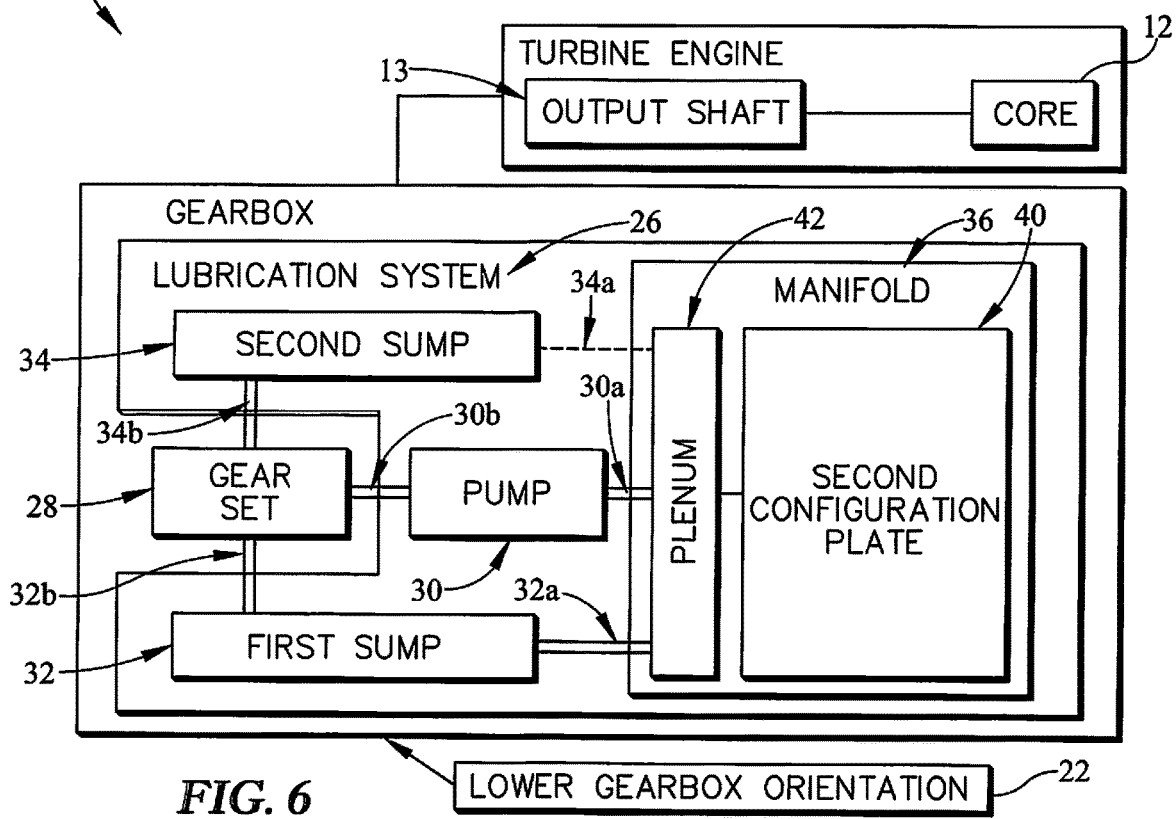
FIG. 6 is a diagrammatic view of the reconfigurable gas turbine engine assembly of FIG. 2 showing that the lubrication system includes a first sump arranged to collect oil moved by way of gravity out of the gear set while the gas turbine engine assembly is in the lower-gearbox orientation and that the second configuration plate fluidly couples the pump to the first sump.

The lubrication system 26 illustratively includes the pump 30, the first sump 32, and the second sump 34 as shown in FIGS. 5 and 6. The pump 30 is configured to pressurize oil to be provided to the gear set 28. When the gas turbine engine assembly 10 is in the upper-gearbox orientation 20, the second sump 34 is configured to collect oil pressurized by the pump 28 and moved into the sump 34 by way of gravitational force. When the gas turbine engine assembly 10 is in the lower-gearbox orientation 22, the first sump 32 is configured to collect oil pressurized by the pump 28 and moved into the sump 32 by way of gravitational force.

In addition, the lubrication system 26 illustratively includes a manifold 36 fluidly coupled to the pump 30, the first sump 32, and the second sump 34 as shown in FIGS. 5 and 6. Specifically, the manifold 36 is fluidly coupled to the pump 30 by a pump line 30a, to the first sump 32 by a first-sump line 32a, and to the second sump 34 by a second-sump line 34a. The manifold 36 is configured to fluidly couple the pump line 30a to one of the first-sump line 32a and the second-sump line 34a depending on the orientation of the gas turbine engine assembly 10.

Figure 3:
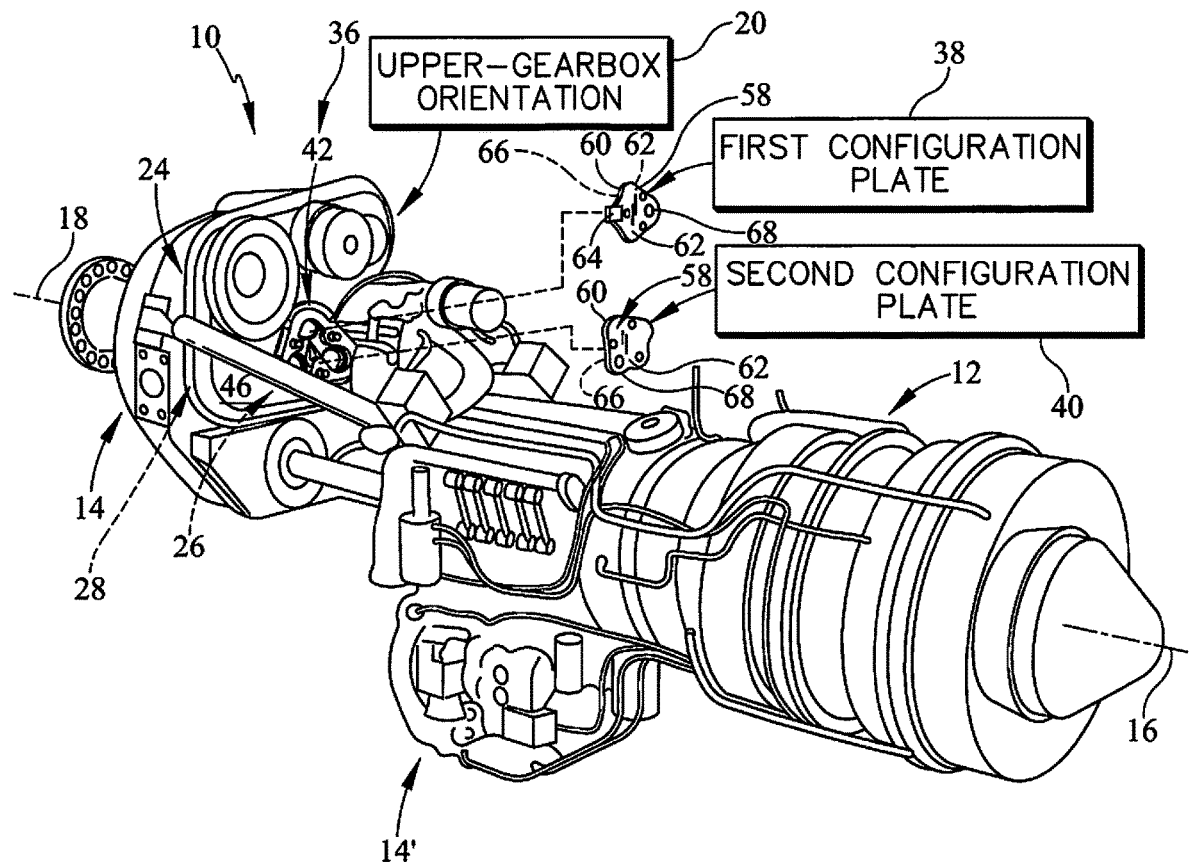
FIG. 3 is a perspective view of the reconfigurable gas turbine engine assembly of FIG. 1 showing a manifold included in a lubrication system of the gas turbine engine assembly and that first and second configuration plates of the manifold are configured for attachment to a plenum of the manifold.

The manifold 36 illustratively includes configuration plates 38, 40 as shown in FIG. 3. When the gas turbine engine assembly 10 is in the upper-gearbox orientation 20, the configuration plate 38 is configured to fluidly couple the pump line 30a to the second-sump line 34a and to block fluid communication between the pump line 30a and the first-sump line 32a. When the gas turbine engine assembly 10 is in the lower-gearbox orientation 22, the configuration plate 40 is configured to fluidly couple the pump line 30a to the first-sump line 32a and to block fluid communication between the pump line 30a and the second-sump line 34a.

Figure 4:
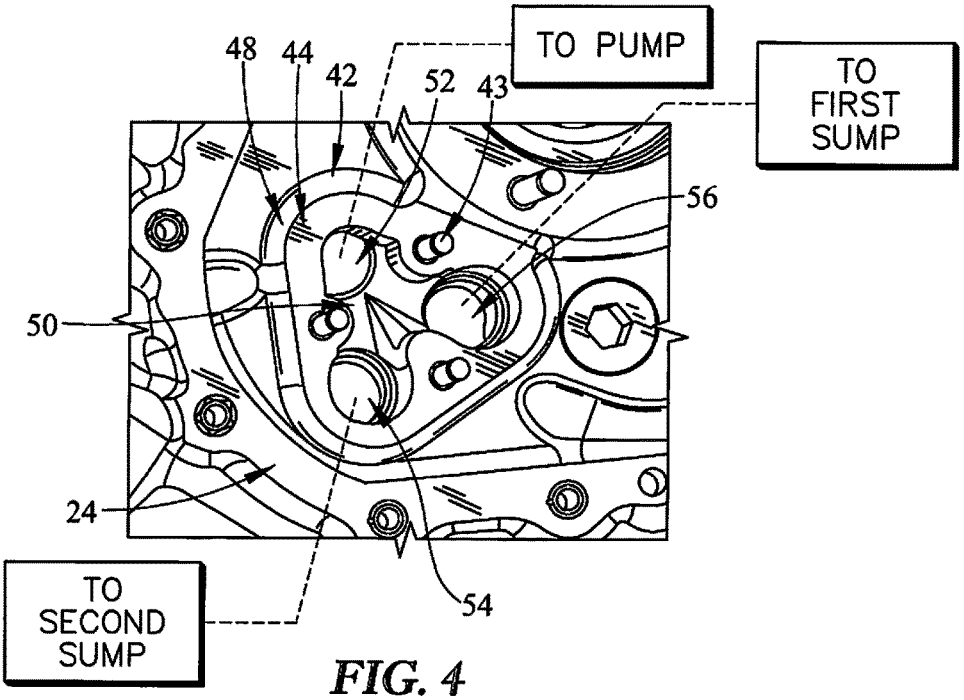
FIG. 4 is a detail view of the plenum of the manifold of FIG. 3 showing a pump line aperture, a first-sump-line aperture, and a second-sump-line aperture opening into the plenum.

In addition, the manifold 36 illustratively includes a plenum 42 as shown in FIGS. 3 and 4. The plenum 42 is configured to conduct oil from one of the first-sump line 32a and the second-sump line 34a to the pump line 30a. The plenum 42 is also configured to be closed off by the configurations plates 38, 40 when one of the plates 38, 40 is coupled to the plenum 42 to set the configuration of the lubrication system 26.

In the illustrative embodiment, the plenum 42 is cast into the housing 24 such that the plenum 42 is integrally formed in the housing 24 as shown in FIG. 4. In other embodiments, however, the plenum 42 may be formed separately from the housing 24. In any case, the configuration plates 38, 40 are configured to be coupled to the plenum 42 by studs 43 and are sized to cover the plenum 42.

The plenum 42 is illustratively defined by a wall 44 that extends outwardly from an outer portion 46 of the housing 24 to form a plenum end surface 48 as shown in FIG. 4. The plenum end surface 48 surrounds the wall 44 and defines an outer perimeter of the plenum 42. The plenum end surface 48 is shaped to couple to the configuration plates 38, 40.

In the illustrative embodiment, the plenum end surface 48 is a planar surface configured to engage the generally planar configuration plates 38, 40 as shown in FIGS. 3 and 4. In other embodiments, however, the plenum end surface 48 may be curved to complement a curved portion of the configuration plates 38, 40. In other embodiments still, the plenum 42, particularly the plenum end surface 48, may have any shape, subcomponents, and/or features to effect engagement between the plenum 42 and the configuration plates 38, 40 when the plates 38, 40 are attached to the plenum 42.

The wall 44 of the plenum 42 illustratively defines a plenum cavity 50 as shown in FIG. 4. The plenum cavity 50 includes a pump aperture 52 that opens into the pump line 30a, a second-sump aperture 54 that opens into the second-sump line 34a, and a first-sump aperture 56 that opens into the first-sump line 32a. In the illustrative embodiment, the apertures 52, 54, 56 are integrally formed with the housing 24.

Each of the configuration plates 38, 40 illustratively includes a cap 58 as shown in FIG. 3. The cap 58 of each plate 38, 40 is illustratively embodied as, or otherwise includes, a generally planar plate that has an inner surface 60 and an outer surface 62 arranged opposite the inner surface 60. The inner surface 60 may partially define the plenum cavity 50 when one of the plates 38, 40 is attached to the plenum 42. The outer surface 62 faces away from the plenum 42 when one of the plates 38, 40 is attached to the plenum 42.

In some embodiments, the cap 58 of the configuration plate 38 may include a prevention tab 64 as shown in FIG. 3. The prevention tab 64 may be configured to prevent final assembly of the first configuration plate 38 if the cap 58 is not installed correctly. For example, the prevention tab 64 may be configured to cover an accessory attachment flange (not shown) formed in the housing 24 to prevent attachment of an accessory to the flange when the configuration plate 38 is attached to the plenum 42.

Each of the configuration plates 38, 40 illustratively includes a plug 66 as shown in FIG. 3. The plug 66 of each plate 38, 40 is illustratively embodied as, or otherwise includes, a cylinder extending outwardly from the inner surface 60 of the cap 58 toward the plenum cavity 50. The plug 66 of each plate 38, 40 is configured to block fluid communication of oil through one of the second-sump and first-sump apertures 54, 56 when one of the plates 38, 40 is attached to the plenum 42. The orientation of each plug 66 is indicated by a visual indicator, such as a cylindrical depression 68, formed on the outer surface 62 of the cap 58.

Referring back to FIGS. 1 and 2, the gas turbine engine assembly 10 illustratively includes an accessory gearbox 14' arranged between the gearbox 14 and the engine core 12 along the central axis 16. When the gas turbine engine assembly 10 is in the upper-gearbox orientation 20, at least a portion of the accessory gearbox 14' is positioned below (i.e., radially inward of) the gearbox 14 and the engine core 12 relative to the central axis 16. When the gas turbine engine assembly 20 is in the lower-gearbox orientation 22, at least a portion of the accessory gearbox 14' is positioned above (i.e., radially outward of) the gearbox 14 and the engine core 12 relative to the central axis 16.

The accessory gearbox 14' is substantially similar to the gearbox 14. The accessory gearbox 14' includes a lubrication system 26' and a gear set 28' substantially similar to the lubrication system 26 and the gear set 28. The accessory gearbox 14' is configured to receive power provided by the engine core 12 and transmit the power to one or more accessories to drive the one or more accessories, i.e. a generator.

Referring now to FIGS. 5 and 6, the pump 30 is illustratively embodied as, or otherwise includes, a single unit, shaft-driven, direct drive, centrifugal lubricant pump that is configured to receive mechanical power from the engine core 12 to pressurize oil from the gear set 28. The pump 30 has dedicated inlet and outlet lines 30a, 30b, which may individually or collectively be referred to herein as pump lines 30a, 30b. The pump line 30a is configured to conduct oil to the pump 30 from the manifold 36, and the pump line 30b is configured to conduct oil away from the pump 30 to the gear set 28.

In other embodiments, the pump 30 may be embodied as, or otherwise include, one or more pump units. In other embodiments still, the pump 30 may be embodied as, or otherwise include, one or more indirect drive pump units. In other embodiments yet still, the pump 30 may be embodied as, or otherwise include, one or more centrifugal or positive displacement units, or any combination thereof.

Diagrammatic representations of the gas turbine engine assembly 10 in the respective upper-gearbox and lower-gearbox orientations 20, 22 are shown in FIGS. 5 and 6. Operation of the gas turbine engine assembly 10 in each of the orientations 20, 22 will be described below with reference to FIGS. 5 and 6.

When the gas turbine engine assembly 10 is in the upper-gearbox orientation 20 shown in FIG. 5, oil is moved into the second sump 34 from the gear set 28. Specifically, because the second sump 34 is arranged at a lower elevation than the gear set 28 in the orientation 20, oil flows by way of gravitational force from the gear set 28 through a sump line 34b to the second sump 34.

When the gas turbine engine assembly 10 is in the upper-gearbox orientation 20 shown in FIG. 5, the configuration plate 38 is attached to the plenum 42 to fluidly couple the pump 30 to the second sump 34. Attachment of the configuration plate 38 to the plenum 42 fluidly couples the second-sump line 34a to the pump line 30a through the second-sump aperture 54 and the pump aperture 52. Additionally, because attachment of the configuration plate 38 to the plenum 42 causes the plug 66 to be inserted into the first-sump aperture 56, such attachment blocks fluid communication between the first-sump line 32a and the pump line 30a through the first-sump aperture 56 and the pump aperture 52.

When the gas turbine engine assembly 10 is in the upper-gearbox orientation 20 shown in FIG. 5, oil moved into the second sump 34 from the gear set 28 is pumped by the pump 30 to the gear set 28. Specifically, oil moved into the second sump 34 from the gear set 28 is pumped by the pump 30 to the gear set 28 through the second-sump line 34a, the second-sump aperture 54, the pump aperture 52, and the pump lines 30a, 30b.

When the gas turbine engine assembly 10 is in the lower-gearbox orientation 22 shown in FIG. 6, oil is moved into the first sump 32 from the gear set 28. Specifically, because the first sump 32 is arranged at a lower elevation than the gear set 28 in the orientation 22, oil flows by way of gravitational force from the gear set 28 through a sump line 32b to the first sump 32.

When the gas turbine engine assembly 10 is in the lower-gearbox orientation 22 shown in FIG. 6, the configuration plate 40 is attached to the plenum 42 to fluidly couple the pump 30 to the first sump 32. Attachment of the configuration plate 40 to the plenum 42 fluidly couples the first-sump line 32a to the pump line 30a through the first-sump aperture 56 and the pump aperture 52. Additionally, because attachment of the configuration plate 40 to the plenum 42 causes the plug 66 to be inserted into the second-sump aperture 54, such attachment blocks fluid communication between the second-sump line 34a and the pump line 30a through the second-sump aperture 54 and the pump aperture 52.

When the gas turbine engine assembly 10 is in the lower-gearbox orientation 22 shown in FIG. 6, oil moved into the first sump 32 from the gear set 28 is pumped by the pump 30 to the gear set 28. Specifically, oil moved into the first sump 32 from the gear set 28 is pumped by the pump 30 to the gear set 28 through the first-sump line 32a, the first-sump aperture 56, the pump aperture 52, and the pump lines 30a, 30b.

Figure 7:
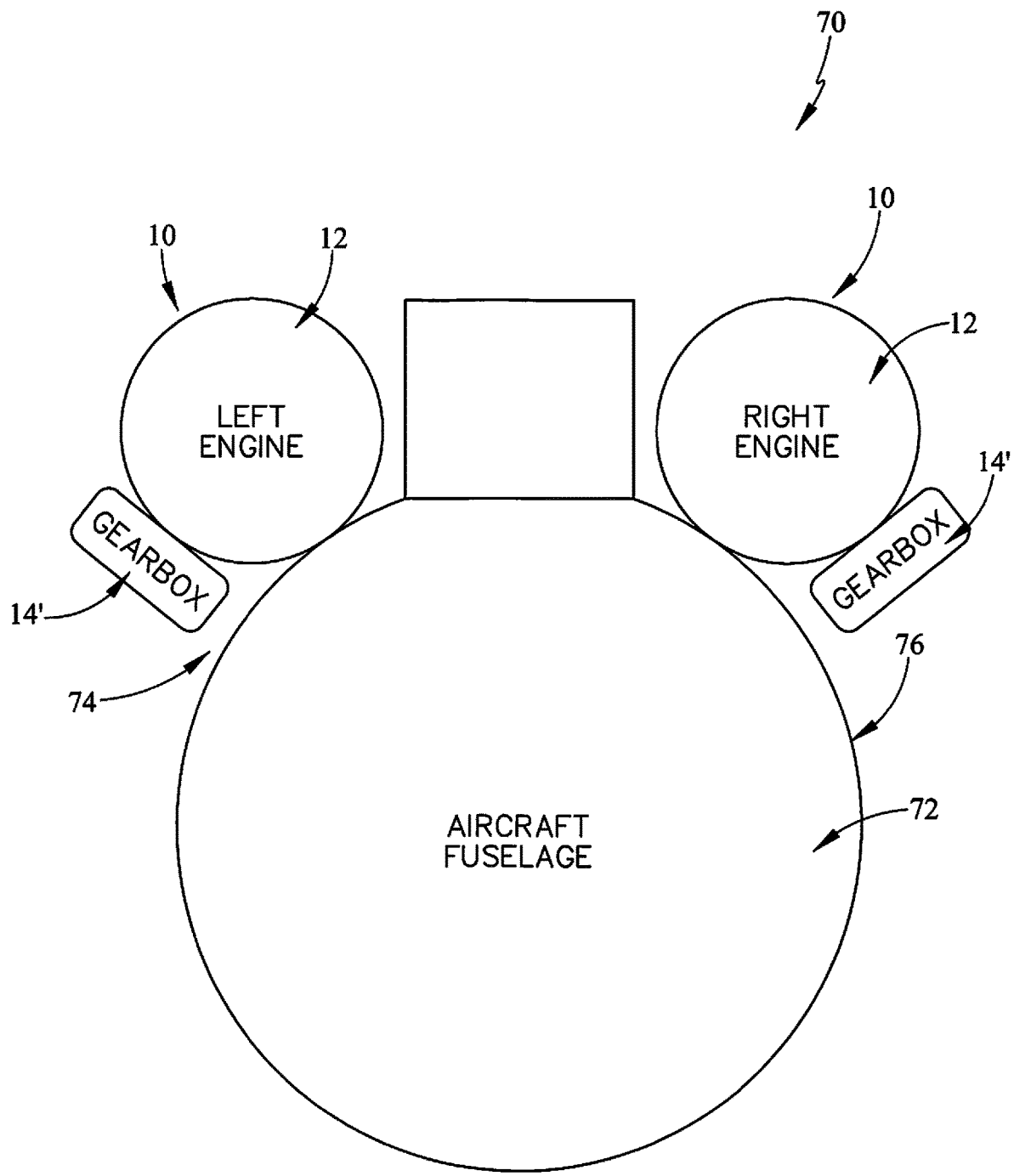
FIG. 7 is a diagrammatic view of an aircraft including a fuselage and a pair of gas turbine engine assemblies similar to the reconfigurable gas turbine engine assembly of FIG. 1 coupled to the fuselage opposite one another showing that accessory gearboxes of the engines are arranged at different orientations such that a lubrication system adapted to accommodate different sump locations via interchangeable configuration plates provides means for using the same gearbox in both orientations.

Referring now to FIG. 7, an illustrative aircraft 70 includes a fuselage 72, a left gas turbine engine assembly 10, and a right gas turbine engine assembly 10. The left gas turbine engine assembly 10 is coupled to a left side 74 of the fuselage 72. The right gas turbine engine assembly 10 is coupled to a right side 76 of the fuselage opposite the left side 74.

The left and right gas turbine engine assemblies 10 are illustratively substantially identical to one another as shown in FIG. 7. However, the engine assembly 10 are mounted at different orientations to accommodate use in the aircraft 70 as shown. Accessory gearboxes 14' of the engine assemblies 10 are arranged at different orientations corresponding to the overall orientation of the engine assemblies 10. Lubrication systems 26' included in accessory gearboxes 14' are reconfigurable to accommodate different gravity-fed sump locations via interchangeable configuration plates as described herein. Accordingly, different gearboxes are not required for use of the engine assembly 10 in both orientations shown.

Referring now to FIGS. 1-7, a method of assembling the gas turbine engine assembly 10 includes coupling the gearbox 14 to the engine core 12. The method further includes coupling the pump 30 to the plenum 42 by the pump line 30a. The method includes further still coupling the first sump 32 to the plenum 42 by the first-sump line 32a. The method includes further yet still coupling the second sump 34 to the plenum 42 by the second-sump line 34a. Finally, the method includes blocking fluid communication into the plenum 42 from one of the first sump 32 and the second sump 34 by coupling one of the configuration plates 38, 40 to the plenum 42. In addition, coupling one of the configuration plates 38, 40 to the plenum 42 includes coupling one of the plates 38, 40 to the plenum 42 such that the plug 66 extends into one of the first-sump line 32a or the second-sump line 34a to block fluid communication into the plenum 42 from one of the first sump 32 and the second sump 34.

Incorporation of a similar lubrication system into a non-axial flow gas turbine engine is described in U.S. Patent Application No. 62/163,700, which is hereby incorporated by reference in its entirety. Such systems may have further applicability in any assembly with gravity-fed sumps for lubricant or other fluids.

Gas turbine engines may be required to be adapted to installation constraints imposed by airframers or system packagers. Such constraints may require that the engine and/or associated gearboxes (e.g., accessory or propeller gearboxes) be oriented in different ways to suit the installation, or to conform to accessibility or maintenance requirements of an end user. To minimize or reduce overall product cost and the complexity of managing multiple product configurations, it may be desirable to avoid using different gearbox housings for each orientation.

The present disclosure may provide a common housing (e.g., the housing 24 of the gearbox 14) for use in multiple gas turbine engine assembly orientations. In one application, such as for a turboprop propeller gearbox, a common housing may be used in a "gearbox high" orientation (e.g., the upper-gearbox orientation 20) or a "gearbox low" orientation (e.g., the lower-gearbox orientation 22). In another application, such as for a turboshaft or turbofan gearbox, a common housing may be used in a "left" orientation and a "right" orientation as suggested in FIG. 7.

To move between the different orientations discussed above, the engine may be rotated about 180 degrees (e.g., about the central axis 16). The present disclosure may provide a plenum pad (e.g., the cap 58 of the configuration plates 38, 40) and an orientable plug (e.g., the plug 66 of the plates 38, 40) to act as a switch between lubrication circuits depending on the engine orientation. For example, the plenum pad and the orientable plug may be applied to two lube networks representing the required engine orientations. The required engine orientations may differ by about 180 degrees in angular location.

One benefit of the present disclosure may be that a single housing could be used for more than one engine installation orientation, with the only difference in the bill of materials being the plenum pad and orientable plug. Additionally, in some applications the plenum pad and orientable plug may include a feature that could prevent inadvertent mis-assembly into a configuration that may not function as intended.

One embodiment of the present concept may be shown in FIGS. 1-6. In that embodiment, the assembly may be set up to enable switching of lubrication circuits for a change in orientation from upright to inverted, or through about 180 degrees of rotation.

Another application of the present concept is shown in FIG. 7. In that application, the right and left side engines may be arranged in different orientations, but a common accessory gearbox 14' may be desirable from a cost and commonality standpoint.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of assembling a gas turbine engine assembly comprising an engine core extending around a central axis, the method comprising:
    coupling a gearbox to the engine core and arranging the engine core aft of the gearbox along the central axis, the gearbox including a lubrication system having a pump adapted to pressurize oil, a first sump located within a housing and configured to collect oil moved into the first sump by way of gravitational force when the housing is arranged in a first orientation, a second sump located within the housing and configured to collect oil moved into the second sump by way of gravitational force when the housing is arranged in a second orientation, and a manifold fluidly having a plenum;
    coupling the pump to a plenum of the manifold by a pump line;
    coupling the first sump to the plenum by a first-sump line;
    coupling the second sump to the plenum by a second-sump line; and
    blocking fluid communication into the plenum from one of the first sump or the second sump by coupling a configuration plate to the plenum.

2. The method of claim 1, wherein coupling the configuration plate to the plenum includes coupling the configuration plate to the plenum such that a plug of the configuration plate extends into one of the first-sump line or the second-sump line to block fluid communication into the plenum from the one of the first sump or the second sump.

3. A gas turbine engine assembly comprising:
    an engine core extending around a central axis; and
    a gearbox coupled to the engine core, the gearbox including a lubrication system having
    a pump adapted to pressurize oil,
    a first sump located within a housing and configured to collect oil moved into the first sump by way of gravitational force when the housing is arranged in a first orientation,
    a second sump located within the housing and configured to collect oil moved into the second sump by way of gravitational force when the housing is arranged in a second orientation, and
    a manifold fluidly coupled to the pump by a pump line, to the first sump by a first-sump line, and to the second sump by a second-sump line, the manifold including a configuration plate configured to fluidly couple the pump line to one of the first-sump line or the second-sump line;
    wherein the engine core is configured to discharge pressurized gasses aftward along the central axis when the housing is arranged in each of the first and second orientations.

4. The gas turbine engine assembly of claim 3, wherein the configuration plate is further configured to block fluid communication between the pump line and one of the first-sump line or the second-sump line.

5. The gas turbine engine assembly of claim 4, wherein at least a portion of each of the first-sump line and the second-sump line are integrally formed in the housing.

6. The gas turbine engine assembly of claim 4, wherein the manifold includes a plenum formed to include a pump aperture opening into the pump line, a first-sump aperture opening into the first-sump line, and a second-sump aperture opening into the second-sump line.

7. The gas turbine engine assembly of claim 6, wherein the plenum is integrally formed in the housing.

8. The gas turbine engine assembly of claim 6, wherein the configuration plate includes a cap configured to cover the plenum and a plug extending from the cap into the plenum to block fluid communication into the plenum from one of the first-sump aperture and the second-sump aperture.

9. The gas turbine engine assembly of claim 8, wherein the configuration plate further includes a prevention tab coupled to the cap to prevent inadvertent mis-assembly of the plenum and the configuration plate.

10. The gas turbine engine assembly of claim 3, wherein the first orientation differs from the second orientation by 180 degrees measured about the central axis.

11. The gas turbine engine assembly of claim 3, wherein the gearbox is arranged about a centerline that is offset and parallel to the central axis.

12. An aircraft comprising:
    a fuselage;
    a first gas turbine engine assembly coupled to a first side of the fuselage; and
    a second gas turbine engine assembly coupled to a second side of the fuselage opposite the first side,
    wherein the first and second gas turbine engine assemblies each include a gearbox having a lubrication system, the lubrication system includes a pump, a first sump arranged within a housing and configured to collect oil moved by way of gravitational force when the housing is in a first orientation, a second sump arranged within the housing and configured to collect oil moved by way of gravitational force when the housing is in a second orientation, and a manifold fluidly coupled to the pump by a pump line, the manifold being coupled to the first sump by a first-sump line, and the manifold further being coupled to the second sump by a second-sump line, and the manifold includes a configuration plate configured to fluidly couple the pump line with one of the first-sump line or the second-sump line.

13. The aircraft of claim 12, wherein the gearbox includes a gear set supported by the housing and in fluid communication with the lubrication system.

14. The aircraft of claim 12, wherein the configuration plate is configured to block fluid communication between the pump line and the other of the first-sump line or the second-sump line.

15. The aircraft of claim 12, wherein at least a portion of each of the first-sump line and the second-sump line are integrally formed in the housing.

16. The aircraft of claim 12, wherein the manifold includes a plenum formed to include a pump aperture opening into the pump line, a first-sump aperture opening into the first-sump line, and a second-sump aperture opening into the second-sump line.

17. The aircraft of claim 16, wherein the plenum is integrally formed in the housing.

18. The aircraft of claim 16, wherein the configuration plate includes a cap configured to cover the plenum and a plug extending from the cap into the plenum to block fluid communication into the plenum from one of the first-sump aperture and the second-sump aperture.

19. The aircraft of claim 12, wherein each of the first and second gas turbine engine assemblies include an engine core extending around a central axis that is coupled to the gearbox, the gearbox is arranged about a centerline, and the central axis is located radially outward of the centerline.

20. The aircraft of claim 12, wherein each of the first and second gas turbine engine assemblies include an accessory gearbox, the accessory gearbox of the first gas turbine engine assembly has a first orientation relative to the fuselage, and the accessory gearbox of the second gas turbine engine assembly has a second orientation relative to the fuselage different from the first orientation.

* * * * *